(12) United States Patent
Brück

(10) Patent No.: US 8,166,750 B2
(45) Date of Patent: May 1, 2012

(54) EXHAUST SYSTEM

(75) Inventor: Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 1286 days.

(21) Appl. No.: 10/912,302

(22) Filed: Aug. 4, 2004

(65) Prior Publication Data

US 2005/0005597 A1    Jan. 13, 2005

Related U.S. Application Data

(60) Division of application No. 10/685,066, filed on Oct. 14, 2003, now abandoned, which is a continuation of application No. PCT/EP01/11744, filed on Oct. 11, 2001.

(30) Foreign Application Priority Data

Apr. 12, 2001    (DE) .................................. 101 18 327

(51) Int. Cl.
*F01N 3/00* (2006.01)
(52) U.S. Cl. ......... 60/297; 60/280; 60/311; 55/DIG. 30; 422/169; 422/177
(58) Field of Classification Search ............. 60/274, 60/280, 297, 302, 311, 295; 55/DIG. 30; 422/169, 170, 171, 177
See application file for complete search history.

(56) References Cited

U.S. PATENT DOCUMENTS

| | | | | |
|---|---|---|---|---|
| 3,978,193 | A | * | 8/1976 | Fedor et al. ............... 423/213.7 |
| 4,597,262 | A | * | 7/1986 | Retallick ......................... 60/274 |
| 5,436,216 | A | | 7/1995 | Toyao et al. |
| 5,493,859 | A | * | 2/1996 | Shinohara et al. .............. 60/302 |
| 5,643,484 | A | * | 7/1997 | Swars et al. .................. 219/552 |
| 5,678,403 | A | * | 10/1997 | Kanehara et al. ............... 60/309 |
| 5,701,736 | A | * | 12/1997 | Morishima et al. ............. 60/297 |
| 5,709,081 | A | * | 1/1998 | Bruestle .......................... 60/274 |
| 5,711,149 | A | | 1/1998 | Araki |

(Continued)

FOREIGN PATENT DOCUMENTS

DE        29 07 815        1/1980

(Continued)

OTHER PUBLICATIONS (Carty, et al.), Monolithic Ceramics and Heterogeneous Catalysts: Honeycombs and Foams, Current Opinion in Solid State & Materials, dated 1996, pp. 88-95.

(Continued)

*Primary Examiner* — Thomas Denion
*Assistant Examiner* — Diem Tran
(74) *Attorney, Agent, or Firm* — Laurence A. Greenberg; Werner H. Stemer; Ralph E. Locher

(57) ABSTRACT

An exhaust gas system for purifying exhaust gases of an internal combustion engine, particularly a diesel engine in a motor vehicle, conducts the exhaust gas in a specific flow direction. A catalytic converter, particularly for converting hydrocarbons and carbon monoxides contained in the exhaust gas, an oxidation catalytic converter, particularly for converting nitrogen monoxide contained in the exhaust gas and a particulate trap for collecting particulates contained in the exhaust gas, are disposed successively in the flow direction. The exhaust gas system ensures a highly efficient conversion of harmful substances contained in the exhaust gas, and a particularly positive effect with respect to the regeneration of the particulate trap also occurs.

17 Claims, 3 Drawing Sheets

U.S. PATENT DOCUMENTS

| | | | |
|---|---|---|---|
| 5,839,273 | A | 11/1998 | Maus |
| 5,987,882 | A * | 11/1999 | Voss et al. .................. 60/274 |
| 6,233,926 | B1 * | 5/2001 | Bailey et al. ................ 60/295 |
| 6,294,141 | B1 * | 9/2001 | Twigg et al. ............. 423/213.7 |
| 6,412,276 | B1 | 7/2002 | Salvat et al. |
| 6,516,610 | B2 | 2/2003 | Hodgson |
| 6,516,611 | B1 | 2/2003 | Schäfer-Sindlinger et al. |
| 6,534,021 | B1 | 3/2003 | Maus |
| 6,827,909 | B1 | 12/2004 | Brück et al. |
| 6,829,891 | B2 * | 12/2004 | Kato et al. .................. 60/297 |
| 6,877,313 | B1 * | 4/2005 | Phillips et al. .............. 60/297 |
| 7,055,314 | B2 * | 6/2006 | Treiber ....................... 60/297 |
| 2002/0174648 | A1 | 11/2002 | Minami |
| 2002/0189247 | A1 | 12/2002 | Kato et al. |
| 2003/0072694 | A1 | 4/2003 | Hodgson et al. |

FOREIGN PATENT DOCUMENTS

| | | |
|---|---|---|
| DE | 37 23 478 A1 | 1/1989 |
| DE | 42 06 812 A1 | 9/1992 |
| DE | 19823469 A1 | 12/1999 |
| EP | 0 341 832 A2 | 11/1989 |
| EP | 0 835 684 A2 | 4/1998 |
| EP | 08928887 B1 | 1/1999 |
| EP | 1 055 805 A1 | 11/2000 |
| EP | 1 057 519 A1 | 12/2000 |
| EP | 1 072 765 A2 | 1/2001 |
| EP | 1078150 B1 | 2/2001 |
| EP | 1204459 A1 | 5/2002 |
| GB | 2 024 646 A | 1/1980 |
| JP | 7332072 A | 12/1995 |
| JP | 9079024 A | 3/1997 |
| JP | 09222009 | 8/1997 |
| JP | 11200852 A | 7/1999 |
| JP | 2000084363 A | 3/2000 |
| JP | 2000120433 A | 4/2000 |
| JP | 2001096113 A | 4/2001 |
| JP | 2001098936 A | 4/2001 |
| WO | WO 91/01178 | 2/1991 |
| WO | 9834015 A1 | 8/1998 |
| WO | 00/34632 | 6/2000 |
| WO | WO 0034632 A1 * | 6/2000 |
| WO | 0112301 A1 | 2/2001 |
| WO | WO 01/80978 | 11/2001 |

OTHER PUBLICATIONS (Twigg, et al.), "Preparation and Properties of Ceramic Foam Catalyst Supports", Preparation of Catalysts vol. IV, dated 1995, pp. 345-359.

(Matteson, et al.), "Diffusion of Aerosols at Various Temperatures", Aerosol Science, vol. 4, dated Jan. 1973, pp. 307-315.

(Mavliev, et al.), "Use of a Net-Like Diffusion Battery for Determination of Aerosol Dispersion", Institute of Chemical Kinetics and Combustion, vol. 46, dated Jul. 18, 1983.

(Breslin, et al.), "Kompakte Hochleistungs-Diffusionsbatterien", Staub Reinhaltung der Luft, vol. 31, No. 8, dated Aug. 1971, pp. 313-316.

"Hybrid Catalyst Targets Diesels", (author not named), dated Apr. 2001, pp. 27-28.

"California's Diesel Risk Reduction Program—Meeting Presentations", (author not named), Air Resources Board, dated Apr. 26, 2005.

(Reizig, et al.), "New Approaches to Catalyst Substrate Application for Diesel Engines", reprint from Diesel Exhaust Emission Control: Diesel Particulate Filters, SAE World Congress, Detroit, MI, dated Mar. 5-8, 2001.

(Hawker), "System Containing Platinum Catalyst and Filter Unit Removes Particulate From Diesel Exhaust", Platinum Metals Review, vol. 39, dated Jan. 1995, pp. 2-8.

(Cooper, et al.), "Role of NO in Diesel Particulate Emission Control", reprint from Developments in Diesel Particulate Control Systems, International Congress and Exposition, Detroit, MI, dated Feb. 27-Mar. 3, 1989.

Reizig et al., "New Approaches to Catalyst Substrate Application for Diesel Engines", Society of Automotive Engineers, Inc., 2001—E15.

Reizig et al., "New Approaches to Catalyst Substrate Application for Diesel Engines", SAE International, www.sae.org, published Mar. 2001—E-16.

European Report on Oral Hearing dated Apr. 2, 2008.

* cited by examiner

EXHAUST SYSTEM

CROSS-REFERENCE TO RELATED APPLICATIONS

This is a divisional application of application Ser. No. 10/685,066, filed Oct. 14, 2003; which was a continuation, application, under 35 U.S.C. §120, of International application PCT/EP01/11744, filed Oct. 11, 2001, which designated the United States; the application also claims the priority, under 35 U.S.C. §119, of German patent application No. 101 18 327.5, filed Apr. 12, 2001; the prior applications are herewith incorporated by reference in their entirety.

BACKGROUND OF THE INVENTION

1. Field of the Invention

The present invention relates to an exhaust gas system for purifying an exhaust gas from an internal combustion engine, in particular for purifying exhaust gases from a diesel engine of an automobile.

Such exhaust systems have been the subject of ongoing development in the past, due to statutory provisions which are imposing ever higher demands on the exhaust systems used in automotive engineering. That has involved using a wide range of components which each fulfill different functions within the exhaust system. For example, starting catalytic converters are known which have a particularly small volume, so that they quickly reach their starting temperature required for catalytic conversion following a cold start of the internal combustion engine. Furthermore, by way of example, electrically heatable catalytic converters are known, which likewise allow an improved cold-starting performance of the exhaust system. What are known as adsorbers in the exhaust system of an internal combustion engine have the task of adsorbing certain pollutants which are present in the exhaust gas for a certain period of time. Those pollutants are preferably stored until a downstream catalytic converter has reached its operating temperature. Moreover, in particular in exhaust systems of diesel engines, particulate traps or particulate filters are used, which collect carbon-based particulates contained in the exhaust gas. The collected particulates are converted continuously or discontinuously, for example by supplying a high level of thermal energy.

SUMMARY OF THE INVENTION

It is accordingly an object of the invention to provide an exhaust system for purifying exhaust gas from an internal combustion engine, in particular for purifying exhaust gases from a diesel engine of an automobile, which overcomes the hereinafore-mentioned disadvantages of the heretofore-known devices of this general type and which ensures particularly effective conversion of pollutants that are present in the exhaust gas, ensuring continuous regeneration of a particulate trap disposed in the exhaust system.

With the foregoing and other objects in view there is provided, in accordance with the invention, an exhaust system for purifying or cleaning exhaust gas from an internal combustion engine, in particular from a diesel engine of an automobile, which can flow through the exhaust system in a preferred flow direction in order to be purified. The exhaust system includes the following successive components, as seen in the flow direction:

1. a catalytic converter, in particular for converting carbon monoxides and hydrocarbons contained in the exhaust gas;
2. an oxidation catalytic converter, in particular for converting nitrogen monoxide contained in the exhaust gas; and
3. a particulate trap for collecting particulates contained in the exhaust gas.

The proposed configuration of the above-mentioned components in the exhaust system has particularly beneficial effects with regard to the regeneration of the particulate trap. These positive effects result unexpectedly from the above-mentioned components being connected in series, as will be explained in more detail below.

The upstream catalytic converter is used in particular to convert carbon monoxides and hydrocarbons. The overall carbon monoxide content in the exhaust gas from diesel engines is relatively low and only increases relatively strongly as it approaches the particulate limit. This is caused in particular by the generally lean operating strategy (with excess air) of the diesel engine with a view to fuel consumption. In this case, high levels of hydrocarbons are caused, for example, in excessively lean fuel/air mixture ranges, and these cannot be converted in time at low temperatures in the combustion chamber (in partial-load mode). An increase in the hydrocarbon contents in the exhaust gas is also present in the event of temporarily very rich combustion (with a deficit of air). The catalytic converter, in particular when it is disposed close to the engine, preferably converts very specific pollutants contained in the exhaust gas (in particular carbon monoxide and unsaturated hydrocarbons). These processes take place quickly and virtually completely due to the high temperatures in the vicinity of the engine.

The oxidation catalytic converter disposed downstream is used in particular to convert nitrogen oxides which are still present in the exhaust gas, due to the fact that the catalytic converter has already converted the majority of the carbon monoxides and unsaturated hydrocarbons. High levels of nitrogen oxides are produced in particular in the case of virtually stoichiometric combustion through to a moderate excess of air (approximately up to $\lambda=3$). In this case, the nitrogen dioxide content in the exhaust gas is usually between 5 and 15%. The oxidation catalytic converter thus has a catalytically active coating, which converts the nitrogen monoxides into nitrogen dioxides. This causes the nitrogen dioxide content in the exhaust gas to be increased considerably, preferably to a level of greater than 50%, in particular over 80% or even 95%, in the exhaust gas. Conversion rates of this nature are achieved because the catalytic converter disposed upstream has already substantially converted further pollutants into harmless constituents. The high nitrogen dioxide content produced in this way by the oxidation catalytic converter has a particularly beneficial effect with regard to the regeneration of the downstream particulate trap.

Particulates, in particular carbon-based particulates, are present in the exhaust gas when the fuel is burnt with an extreme deficit of air and, due to the locally very inhomogeneous fuel-air mixture, are typical of combustion in the diesel engine. The particulates usually tend to be deposited at the coatings of the components and/or at the outer wall, such as for example in the exhaust section, of the exhaust system. Then, in the event of load changes, they are expelled in the form of a cloud of particulates. As a result of diffusion and adsorption phenomena, these particulates are retained and continuously chemically converted by the particulate trap, which according to the invention is disposed downstream. This ensures continuous regeneration of the particulate trap and prevents flow paths in the interior of the particulate trap from becoming blocked. This regeneration process is promoted surprisingly effectively by the nitrogen dioxide which has previously been generated by the oxidation catalytic converter. Consequently, on one hand effective conversion of the carbon-based particulates is ensured, and on the other hand an increase in pressure in the exhaust system as a result of blocked flow paths is avoided. In this context, it is preferable for all of the components to be disposed close to the engine, i.e. in particular not at the underbody of an automobile. This ensures sufficiently high temperatures over the operating life of the internal combustion engine (even immediately after a cold start), so that the exhaust emission guidelines which currently apply can be complied with by some distance with regard to the individual pollutants remaining in the exhaust gas.

In accordance with another feature of the invention, there is provided a turbocharger. The catalytic converter is disposed upstream of the turbocharger, and the oxidation catalytic converter is disposed downstream of the turbocharger, as seen in the flow direction. Turbocharging is a way of increasing the power of an internal combustion engine, which is used in particular in conjunction with diesel engines. During the turbocharging, a work-performing machine compresses the air required for the engine combustion process, so that a greater mass of air passes into the cylinder or combustion chamber per cycle of the internal combustion engine. For this purpose, the compressor is driven, for example, by a turbocharger which utilizes the energy of the exhaust gas. The coupling to the engine is not mechanical in this case, but rather purely thermal, and in the automotive industry it is primarily the principle of ram charging which is employed. Placing the catalytic converter upstream of a turbocharger of this nature ensures that the operating temperature of the catalytic converter is reached very quickly, since in this way dissipation of heat from the exhaust gas as a result of contact with components of the turbocharger is avoided. Moreover, this ensures that the catalytic converter is disposed close to the engine. In this context, it is particularly advantageous for the catalytic converter to be directly connected to the internal combustion engine and in particular to be disposed in an exhaust manifold. It is also possible for a plurality of small converters each to be fitted in a separate exhaust section of an exhaust manifold, in which case they are preferably secured directly at or to a connection point of the exhaust manifold and the internal combustion engine. The thermal light-off performance of the catalytic converter is significantly enhanced by the proximity to the combustion chambers or the cylinders of the internal combustion engine.

In accordance with a further feature of the invention, the oxidation catalytic converter has at least two zones. The zone which is furthest away from the internal combustion engine is constructed with a higher specific heat capacity than the others of the at least two zones. The oxidation catalytic converter usually has a honeycomb structure, in which case partitions form passages through which an exhaust gas can flow. The increase in the specific heat capacity (in particular the surface area-specific heat capacity) can be ensured, for example, by making the partitions thicker. For example, if the partitions in the upstream zone of the oxidation catalytic converter have a thickness of less than 0.03 mm, the partitions in a central zone have a thickness of approximately 0.03 to 0.06 mm, while a downstream zone is constructed, for example, with a partition thickness of at least 0.08 mm. The number of zones and the thickness of the partitions is to be oriented in particular to the specific composition of the exhaust gas and its thermal energy. The increase in the specific heat capacity in the flow direction means that the oxidation catalytic converter in upstream zones reaches its operating temperature at a very early stage, with the catalytic reaction which is induced there delivering sufficient exothermic energy for the downstream zones likewise to be heated rapidly. In this case, the zone with the high heat capacity represents a type of heat storage device even after the internal combustion engine has been switched off, so that, for example, the cold-start phase after a restart is significantly shortened.

In accordance with an added feature of the invention, the particulate trap is disposed directly downstream of the oxidation catalytic converter, preferably at a distance of less than 50 mm, in particular even less than 20 mm, as seen in the flow direction. If the exhaust system is configured in this way, it is particularly advantageous to accommodate the oxidation catalytic converter and the particulate trap in a common housing. In this context, preference is given to an embodiment in which the oxidation catalytic converter is integrated in the particulate trap and the particulate trap preferably has a catalytically active coating. This allows a particularly space-saving configuration of oxidation catalytic converter and particulate trap, which is important especially with a view toward placing the exhaust system close to the engine.

In accordance with an additional feature of the invention, the particulate trap has an overall volume (walls plus cavities) of less than 75% of a volumetric capacity of the internal combustion engine, in particular less than 50% and preferably even less than 25%. Under certain circumstances, such as for example when disposed close to the engine and/or during a very brief, discontinuous regeneration of the particulate trap, it is even possible for the overall volume to be reduced still further, if appropriate to a size of less than 5% or even 1% of the volumetric capacity of the internal combustion engine. In this context, the term volumetric capacity is to be understood as meaning the sum of the volumes of the cylinders or combustion chambers of the internal combustion engine in which the combustion of the fuel takes place.

The particulate trap therefore has a very small overall volume, which on one hand ensures a space-saving configuration and on the other hand ensures effective chemical conversion of the particulates. The particulate trap may in particular be constructed to be this small due to the fact that the upstream oxidation catalytic converter produces so much nitrogen dioxide that continuous regeneration of the particulate trap is ensured and there is no need for a large storage volume for carbon-based particulates which are yet to be converted.

In accordance with yet another feature of the invention, it is particularly advantageous for the particulate trap to have freely accessible passages in which turbulence points and calming points and/or diverter devices are disposed. This increases the probability of particulates reacting with nitrogen oxide in a simple way by lengthening the residence time of particulates (in particular carbon-based particulates) in the particulate trap. This is achieved, in the case of flow paths which are inherently freely accessible, by having a sufficient number of turbulence and calming points and/or diversions, promoting the deposition of the particulates at the walls. While a particle which flies along in the exhaust-gas stream has only a slight chance of reacting with other constituents of the exhaust gas, this chance increases immensely if the particle is stopped in a turbulence or calming point or is deposited at a partition. All of the nitrogen dioxides moving past are then available for reaction, so that the particulates are rapidly broken down. Consequently, the particulate trap cannot become blocked, but rather is constantly regenerated.

In accordance with yet a further feature of the invention, the catalytic converter has a converter volume which is at most half a catalytic converter volume of the oxidation catalytic converter. The terms converter volume and catalytic converter volume in each case mean the external volumes (walls plus passages) of the at least one converter or of the oxidation catalytic converter. Such a small configuration of the catalytic converter assists with the light-off performance and also promotes a space-saving configuration.

In accordance with a concomitant feature of the invention, at least one and preferably each component of the exhaust system has a honeycomb structure with passages through which an exhaust gas can flow. The honeycomb structure is formed by at least partially structured metal foils. The honeycomb structure of the converter and/or of the oxidation catalytic converter in this case has a passage density of at least 600 cpsi (cells per square inch), in particular greater than 1000 cpsi. The particulate trap may require slightly larger passage cross sections, meaning that it is to be constructed with a passage density of greater than 200 cpsi, in particular 400 cpsi or 600 cpsi, in which case a sufficient surface area to accumulate the particles is always available. If the oxidation catalytic converter is constructed with a honeycomb structure including metal foils of this nature, the metal foils preferably have a thickness of less than 0.06 mm, in particular less than 0.03 mm.

Other features which are considered as characteristic for the invention are set forth in the appended claims.

Although the invention is illustrated and described herein as embodied in an exhaust system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
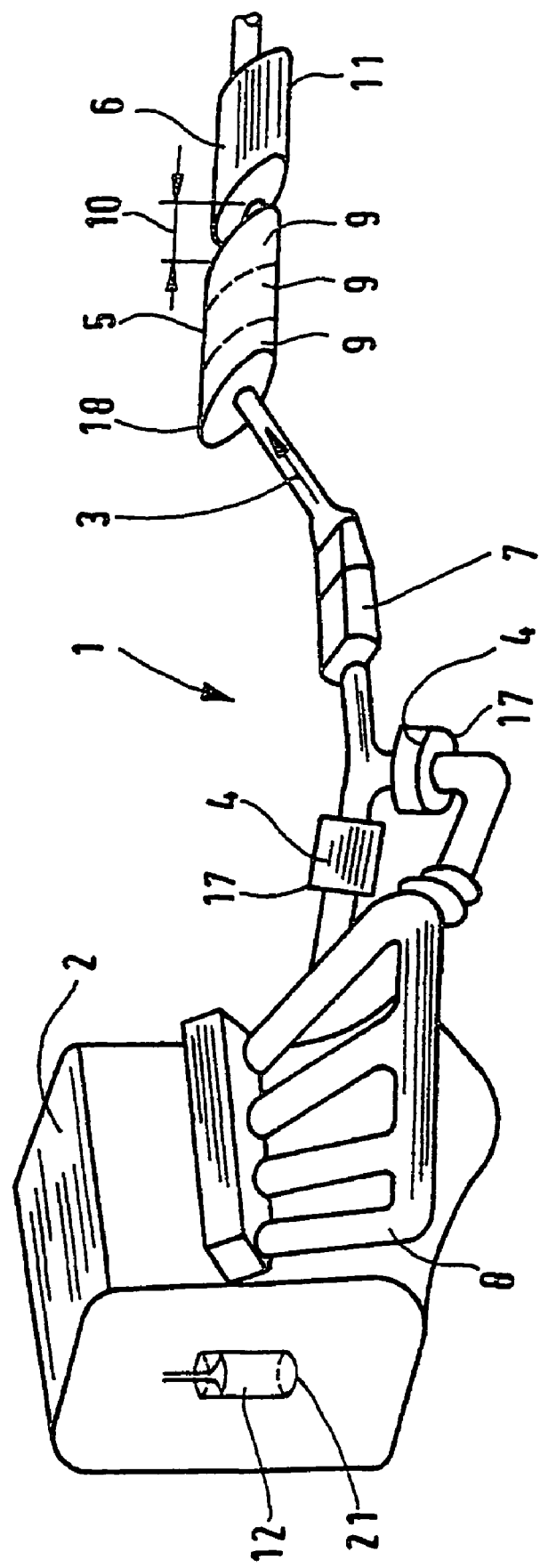
FIG. 1 is a diagrammatic, perspective view of an embodiment of an exhaust system according to the invention.

Referring now to the figures of the drawings in detail and first, particularly, to FIG. 1 thereof, there is seen a diagrammatic and perspective view of an exhaust system 1 for purifying exhaust gas from a diesel engine. In this system, the exhaust gas, starting from the internal combustion engine or diesel engine 2, flows through the exhaust system 1 in a preferred flow direction 3. The exhaust system 1 includes, in succession in the flow direction 3, a catalytic converter 4, in particular for converting carbon monoxides and hydrocarbons contained in the exhaust gas, an oxidation catalytic converter 5, in particular for converting nitrogen monoxides contained in the exhaust gas, and a particulate trap 6 for collecting particulates, in particular carbon-based particulates, contained in the exhaust gas. Since the illustrated exhaust system 1 in some cases has a plurality of exhaust sections upstream of a turbocharger 7, the illustrated embodiment is equipped with two catalytic converters 4 which are disposed very close to the internal combustion engine 2. In this case, it is also possible to place the catalytic converters 4 in the exhaust sections of one or more exhaust manifold 8 which is directly connected to the internal combustion engine 2. The illustrated oxidation catalytic converter 5 has a plurality of zones 9. The zones 9 have an increasing specific heat capacity as seen in the flow direction 3 of the exhaust gas. The particulate trap 6 is disposed immediately downstream of the oxidation catalytic converter 5, at a distance 10 of less than 50 mm, as seen in the flow direction 3. The particulate trap 6 in this case has a total volume 11 which is preferably less than 75% of a volumetric capacity 12 of the internal combustion engine 2. The volumetric capacity 12 corresponds to the sum of individual volumes of cylinders 21 of the internal combustion engine 2. Furthermore, the catalytic converters 4 are constructed with a converter volume 17 which is at most half a catalytic converter volume 18 of the oxidation catalytic converter 5. In this case, the term converter volume 17 is to be understood as meaning the sum of the volumes of the catalytic converters 4.

The illustrated exhaust system 1 is preferably to be disposed in the immediate vicinity of the internal combustion engine 2. In this context, it is important in particular to avoid one of the components 4, 5, 6 being disposed in the underbody of an automobile.

Figure 2:
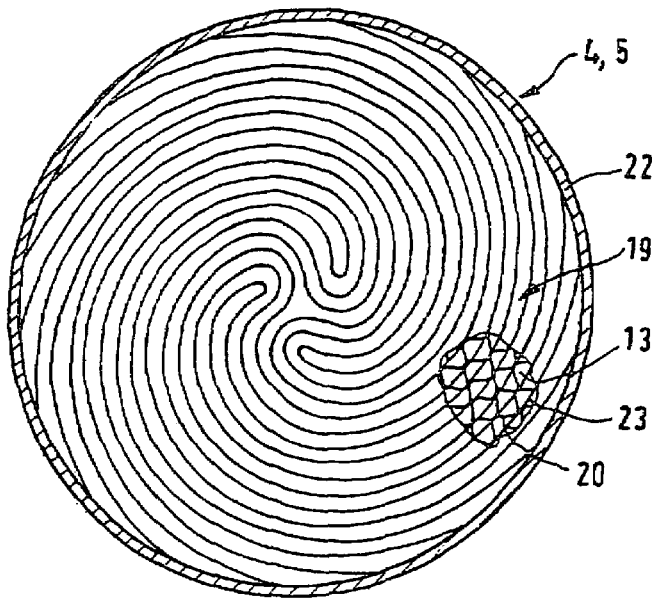
FIG. 2 is an enlarged plan view of a component of the exhaust system with a honeycomb structure.

FIG. 2 shows a plan view of a catalytic converter 4 or an oxidation catalytic converter 5 with a honeycomb structure 19. The honeycomb structure 19 has passages 13 through which an exhaust gas can flow and is formed through the use of at least partially structured metal foils 20. For this purpose, smooth metal foils 23 and structured metal foils 20 were initially stacked and then wound up, with the honeycomb structure 19 being disposed in a tubular casing 22 in order to increase the stability of the component. The honeycomb structure 19 is preferably constructed with a catalytic coating, which is distinguished in particular by a very fissured surface and consequently also by a high level of efficiency with regard to the conversion of pollutants.

Figure 3:
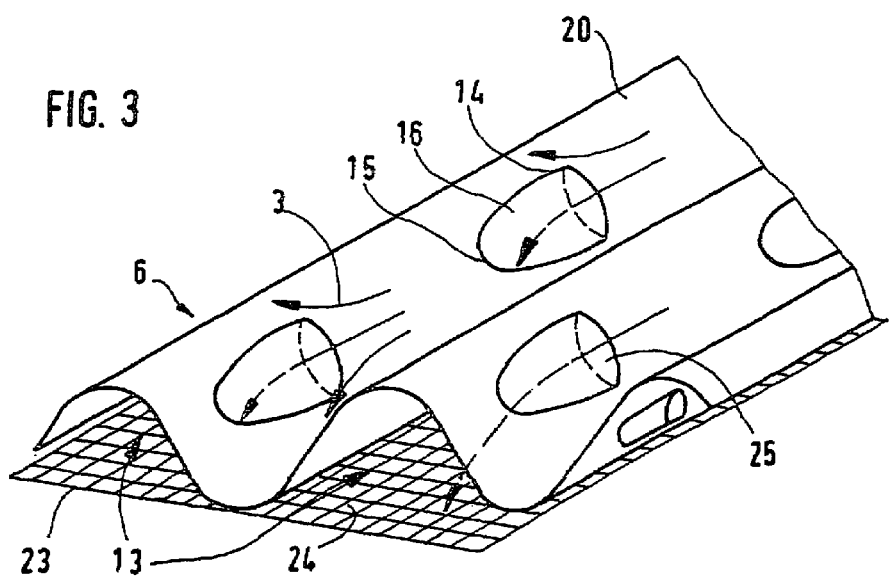
FIG. 3 is a further enlarged, fragmentary, perspective view of an embodiment of the exhaust system particulate trap.

FIG. 3 shows a fragmentary, diagrammatic and perspective view of a particulate trap 6. The particulate trap 6 is composed of a structured metal foil 20 and of a smooth metal foil 23 with apertures 24 and forms freely accessible passages 13. Wing-shaped diverter devices 16 with openings 25 lead to the effects which have been described above. The diverter devices 16 have calming points 15 and turbulence points 14. The diverter devices 16 swirl up the exhaust gas so that the particles remain in the particulate trap 6 longer and therefore find it easier to react with other constituents of the exhaust gas. Depending on the precise configuration of the diverter devices 16, particulates are also thrown onto the metal foils 20 and 23, where they continue to stick. There, the carbon-based particulates are chemically converted by the nitrogen dioxide flowing through so continuously and effectively that free flow through the passages is ensured at any time.

Figure 4:
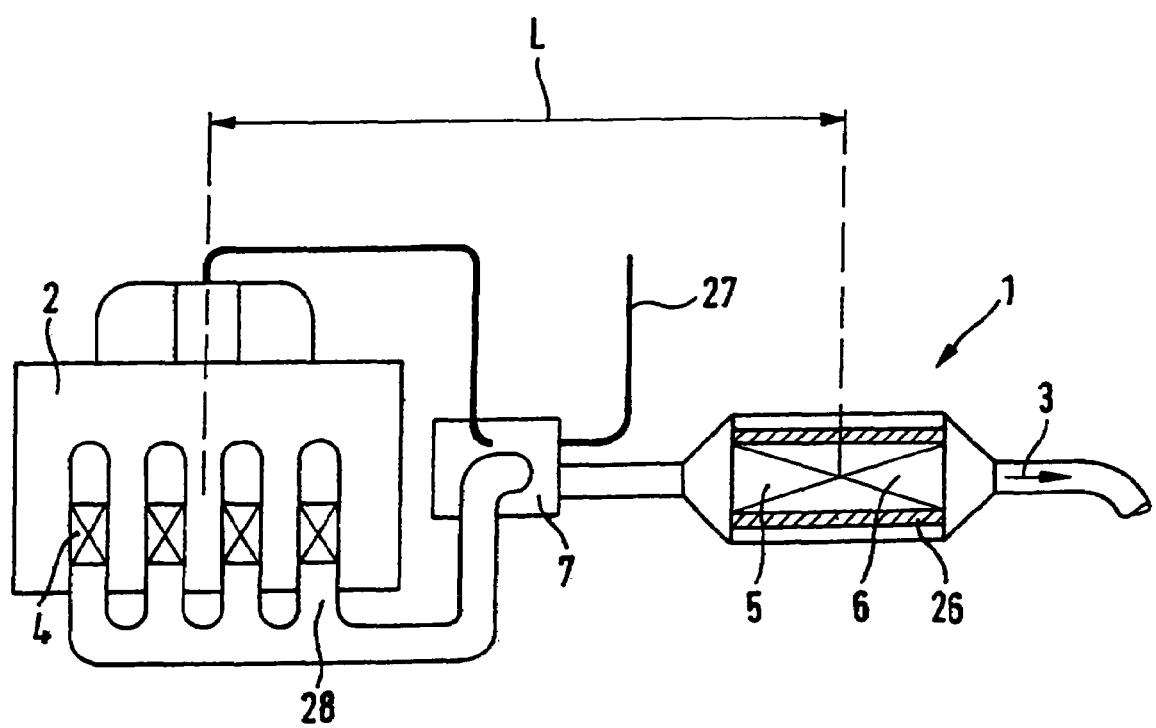
FIG. 4 is an elevational view of a further embodiment of the exhaust system according to the invention disposed close to the engine.

FIG. 4 diagrammatically depicts a further configuration of the exhaust system 1 disposed close to the engine 2. The exhaust system 1 is used to purify exhaust gas from the internal combustion engine 2, in particular a diesel engine of an automobile, and the exhaust gas flows through it in a flow direction 3. The exhaust system 1 includes, in succession in the flow direction 3, at least one catalytic converter 4, in particular for converting carbon monoxides and hydrocarbons contained in the exhaust gas, an oxidation catalytic converter 5, in particular for converting nitrogen monoxide contained in the exhaust gas, and a particulate trap 6 for collecting particulates contained in the exhaust gas. In the embodiment shown, the catalytic converters 4 are disposed particularly close to the combustion chambers of the engine, and specifically there is a small catalytic converter 4 disposed in each outlet from the combustion chambers in an exhaust manifold 28. Therefore, the catalytic converters 4 are even connected upstream of the turbocharger 7, which is constructed in particular as an exhaust-gas turbocharger, and which is used to compress fresh air supplied to the engine (fresh air supply 27).

In the case of the illustrated exhaust system 1, the oxidation catalytic converter 5 and the particulate trap 6 are disposed in a common housing 26, with the oxidation catalytic converter 5 being integrated in the particulate trap 6. For this purpose, the particulate trap 6 has a catalytically active coating in the same way as the oxidation catalytic converter 5. The particulate trap 6 still has an overall volume 11 which is less than 75% of a volumetric capacity 12 of the internal combustion engine 2, in particular less than 50% and preferably even less than 25%. In order to ensure that the highest possible temperatures are present for the purpose of regenerating the particulate trap 6 during operation of the internal combustion engine 2 and of the exhaust installation 1, the particulate trap 6 is disposed at a distance L from the engine. This distance L is preferably less than 80 cm. In this context, the distance L is preferably to be understood as meaning a path length covered by the exhaust gas before it reaches the particulate trap 6.

The exhaust system according to the invention ensures very effective conversion of pollutants contained in the exhaust gas from a diesel engine (in particular carbon monoxide, unsaturated hydrocarbons, nitrogen oxides, carbon-based particulates), and in addition has a particularly positive effect with regard to the regeneration of the particulate trap. More accurately, the increased production of nitrogen dioxide by the oxidation catalytic converter, due to the upstream catalytic converter, means that a sufficient quantity of nitrogen dioxide is made available to the particulate trap to ensure continuous regeneration. This prevents blocked passages and means that emissions are well below the current exhaust emissions limits.

I claim:

1. An exhaust system for purifying exhaust gas flowing from an internal combustion engine through the exhaust system in a flow direction, the exhaust system comprising, successively in the flow direction:
   a catalytic converter for converting carbon monoxides and hydrocarbons contained in the exhaust gas, an oxidation catalytic converter disposed downstream of said catalytic convertor in the flow direction, said oxidation catalytic convertor for converting nitrogen monoxide contained in the exhaust gas, a turbocharger, said catalytic converter disposed upstream of said turbocharger, said oxidation catalytic converter disposed downstream of said turbocharger in the flow direction, and a particulate trap disposed downstream of said oxidation catalytic converter in the flow direction, said particulate trap for collecting particulates contained in the exhaust gas, said particulate trap having freely accessible passages and diverter devices disposed in said passages.

2. The exhaust system according to claim 1, wherein the internal combustion engine is an automobile diesel engine.

3. The exhaust system according to claim 1, wherein said catalytic converter is disposed close to the internal combustion engine.

4. The exhaust system according to claim 1, wherein said catalytic converter is disposed in an exhaust manifold directly connected to the internal combustion engine.

5. The exhaust system according to claim 1, wherein said oxidation catalytic converter has at least two zones including a zone disposed furthest away from the internal combustion engine and at least one remaining zone, and said zone disposed furthest away from the internal combustion engine has a higher specific heat capacity than said at least one remaining zone.

6. The exhaust system according to claim 1, wherein the internal combustion engine has a volumetric capacity, and said particulate trap has a total volume of less than 75% of the volumetric capacity of the internal combustion engine.

7. The exhaust system according to claim 1, wherein the internal combustion engine has a volumetric capacity, and said particulate trap has a total volume of less than 50% of the volumetric capacity of the internal combustion engine.

8. The exhaust system according to claim 1, wherein the internal combustion engine has a volumetric capacity, and said particulate trap has a total volume of less than 25% of the volumetric capacity of the internal combustion engine.

9. The exhaust system according to claim 1, wherein said particulate trap has turbulence points and calming points disposed in said passages.

10. The exhaust system according to claim 1, wherein said oxidation catalytic converter has a catalytic converter volume, and said catalytic converter has a converter volume of at most half of said catalytic converter volume of said oxidation catalytic converter.

11. The exhaust system according to claim 1, wherein at least one of said catalytic converter, oxidation catalytic converter and particulate trap has a honeycomb structure formed of at least partially structured metal foils defining passages through which exhaust gas can flow.

12. The exhaust system according to claim 1, wherein said particulate trap is disposed directly downstream of said oxidation catalytic converter, in the flow direction.

13. The exhaust system according to claim 12, wherein said particulate trap is disposed at a distance of less than 50 mm from said oxidation catalytic converter.

14. The exhaust system according to claim 12, wherein said particulate trap is disposed at a distance of less than 20 mm from said oxidation catalytic converter.

15. The exhaust system according to claim 12, wherein said oxidation catalytic converter and said particulate trap are disposed in a common housing.

16. The exhaust system according to claim 15, wherein said oxidation catalytic converter is integrated in said particulate trap.

17. The exhaust system according to claim 16, wherein said particulate trap has a catalytically active coating.

* * * * *